Patented Nov. 27, 1928.

1,693,500

UNITED STATES PATENT OFFICE.

GEOFFREY WHEELER, OF LONDON, ENGLAND.

PROCESS FOR COLORING THE IMAGE ON PHOTOGRAPHIC PLATES, FILMS, OR THE LIKE.

No Drawing. Application filed January 19, 1927, Serial No. 162,204, and in Great Britain February 27, 1926.

This invention relates to an improved process for coloring the image on photographic plates, films or the like.

According to this invention the image on a photographic film is toned by a solution of titanium trichloride converting the silver image to a compound of a yellow color. The said invention also contemplates a combination of chemical toning and dye toning, the chemical toning being preferably effected as a part of the subsequent treatment of the dyed image. For this purpose, by way of example, the print is first treated with a solution of potassium ferricyanide and chromic acid or other equivalent reagent for a sufficient time to thoroughly bleach the silver image. It is then rinsed in water to remove the surplus bleaching solution, immersed in a solution of a weak reducing agent such as sodium bisulphite, and again washed. A solution of a suitable dye or mixture of dyes is then applied, after which the print is treated in a weak toning solution of titanous chloride or titanium trichloride. In this bath, the unmordanted dye diffuses into the solution and by continuing the treatment the dye is decolorized in the parts of the image where the silver deposit is lightest. During this operation the image is converted to a substantially transparent compound of a yellow color. In the final result the densest part of the image is colored by the dye to one tint, the amount of this coloration by the dye becoming gradually less in the lighter parts until in the lightest parts practically no dye is retained, such parts being colored a yellow tint only, as a result of the chemical toning.

The improved process can be employed to produce colored transparencies in which opposite sides of films or plates coated on both sides, are treated with dyes of different colors. The images on the opposite sides of the plate are preferably produced from negatives giving different color values of the object photographed. The two sides of the film or plate can be treated separately or simultaneously, the opposite sides being treated with suitable dyes or mixtures of dyes. As a result of this treatment the image representing, for example, the red or red to yellow color value of the object photographed, when treated in this manner, has a coloration varying according to the density of the silver deposit from red in the parts where the silver is densest through orange to a yellow in the parts where the silver deposit is lightest. The image representing the blue or blue to green color value can be appropriately dyed and then both sides of the plate or either side alone, can be chemically toned as above mentioned. When only one side is to be treated the side not undergoing treatment is suitably protected.

In carrying the invention into practice, by way of example, the print or positive is immersed for about two minutes in a bleaching bath containing about 0.5% of chromic acid and about 0.5% of potassium ferricyanide, which may be prepared by mixing equal quantities of a 1% solution of chromic acid and of a 1% solution of potassium ferricyanide or other equivalent reagent. The film after removal from this bath, is rinsed in water, immersed for about three minutes in a 1% solution of sodium bisulphite and washed for about ten mniutes, preferably in running water. The above baths and the rinsing water are preferably at a temperature between 50 and 60 degrees F.

After the superfluous moisture has been drained off or otherwise removed, the film is dyed. For the red side an aqueous solution of basic magenta (diaminomethyl-fuchsonimonium chloride) induline scarlet (aminoethyl-tolunaphthazonium chloride), or azine scarlet, (diamino-methyl-ditolazonium chloride), may be used. The dye is ground to a fine powder and mixed gradually whilst being stirred with a sufficient quantity of water at 120 degrees F. When the dye has dissolved, an additional quantity of water at atmospheric temperature may be added to make, for example, in the case of basic magenta (diaminomethyl-fuchsonimonium chloride) a 0.35% to 2% solution. This solution is filtered before use, and the addition of a small percentage of acetic acid may be found advisable.

For the blue side methylene blue 2B (tetramethyldiamino-diphenazthionium chloride), thionine (zinc double salt of trimethylethyl diamino-diphenazthionium chloride) or turquoise blue (zinc double chloride of tetramethyl-diamino-diphenyl-p'-nitrotolylcarbinol anhydide) can be employed. A 1% to 4% aqueous solution of methylene blue 2B (tetramethyl diamino-diphenaz-thionium chloride), can be used ground with water in a mortar and diluted according to requirements. A proportion, for example, 5 cc. of a 4% solution of borax can be added to each 100 cc. of the dye solution. This borax solution can be prepared by dissolving the borax in hot water, and when the borax is dissolved the solution is cooled care being however taken to avoid crystallization. When the borax solution is added to the dye solution, the mixture is stirred for five minutes, and filtered before use.

The dyed film is subsequently treated in a bath made up by adding to 100 cc. of water, 0.65 cc. of 15% solution of titanium trichloride and 1 cc. of hydrochloric acid (sp. gr. 1.16). The titanium trichloride bath can be worked for only a limited period. This period can however be prolonged by an addition of citric accid to the bath, and still further prolonged by the addition of powdered zinc. Thus 0.2 cc. of 10% solution of citric acid and 0.1 grammes of powdered zinc can be added per 100 cc. of the acidulated titanium trichloride solution with good results. The zinc may advantageously be in a state of fine subdivision, otherwise it may settle in the bath and its action be thus delayed. The film remains in this bath for from three to ten minutes after which it is washed in water for about two minutes and then finally dried.

The proportions of the reagents hereinabove specified are given only by way of example, some departure from the exact proportions being permissible, and other dye substances than those above enumerated can be employed according to the colors or tints it is desired to impart to the film.

I claim:

A process for coloring the image on photographic films, wherein the image is bleached, subjected to the action of a reducing agent, dyed with a dye and toned with a solution of titanium trichloride.

GEOFFREY WHEELER.